No. 772,719. PATENTED OCT. 18, 1904.
J. KOSLOFSKY.
SINK.
APPLICATION FILED JUNE 7, 1904.
NO MODEL.
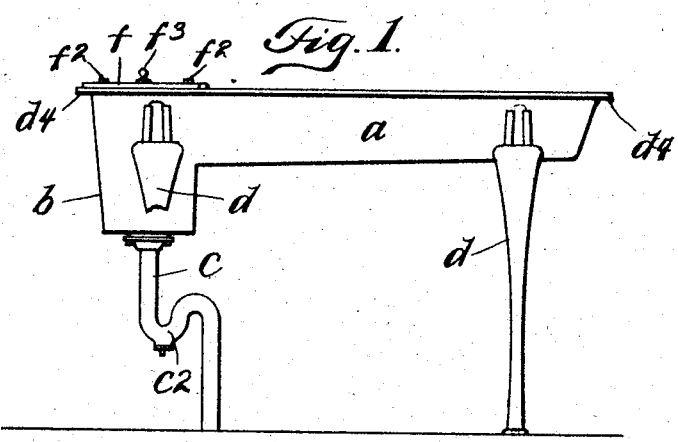
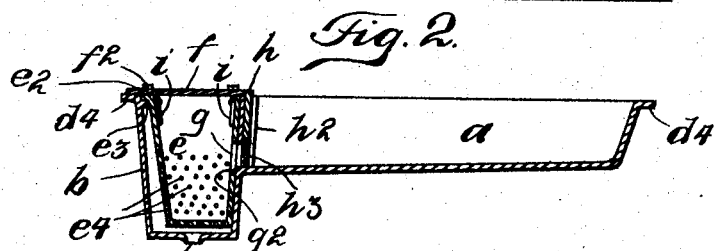
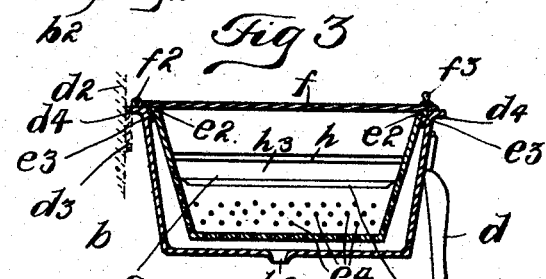
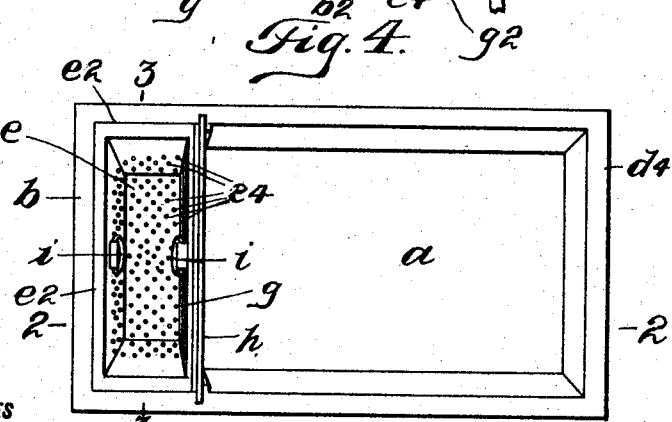
WITNESSES
A. B. Mattingly
F. A. Stewart
INVENTOR
Julius Koslofsky
BY Edgar Tate & Co
ATTORNEYS No. 772,719. Patented October 18, 1904.

UNITED STATES PATENT OFFICE.

JULIUS KOSLOFSKY, OF NEW YORK, N. Y.

SINK.

SPECIFICATION forming part of Letters Patent No. 772,719, dated October 18, 1904.

Application filed June 7, 1904. Serial No. 211,477. (No model.)

*To all whom it may concern:*

Be it known that I, JULIUS KOSLOFSKY, a citizen of the United States, residing at New York, in the county of New York and State of New York, have invented certain new and useful Improvements in Sinks, of which the following is a specification, such as will enable those skilled in the art to which it appertains to make and use the same.

This invention relates to sinks, and the object thereof is to provide an improved device of this class designed particularly for use as a kitchen-sink; and with this and other objects in view the invention consists in a device of the class constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of my improved sink, showing the same mounted on legs and one of the legs being broken away; Fig. 2, a longitudinal central vertical section of the sink on the line 2 2 of Fig. 4; Fig. 3, a transverse section on the line 3 3 of Fig. 4, and Fig. 4 a plan view of the sink.

In the practice of my invention I provide a sink comprising a main part $a$ and a supplemental end part $b$. The bottom of the main part $a$ of the sink is inclined downwardly toward the supplemental end part $b$, and said supplemental end part $b$ is deeper than the main part $a$, the depth of the said part $b$ being preferably about twice that of the main part $a$. The supplemental part $b$ extends entirely across the main part $a$ and is provided centrally of the bottom thereof with an opening $b^2$, which communicates in practice with the usual discharge-pipe $c$, provided with a trap $c^2$.

In the drawings forming part of this specification I have shown the sink supported by legs $d$, one of which is broken away in Fig. 1, and I have also shown in Fig. 3 at $d^2$ a part of a wall adjacent to which the sink is placed, and said wall in practice is provided with a strip, plate, or board $d^3$, against which and on which the top portion of the sink rests, and said top portion of the sink consists of or is preferably provided with a flange $d^4$, which extends entirely around the same and the back part of which rests on the strip, plate, or board $d^3$.

The supplemental transverse end portion $b$ of the sink is provided with a removable receptacle $e$, which is of the same general form as the supplemental part $b$, and both of said parts are preferably tapered inwardly and downwardly, as are also the side walls of the main part $a$ of the sink, and the opposite side portions of the receptacle $e$ and the back thereof opposite the main part $a$ of the sink in the form of construction shown are provided at the top with an outwardly-directed flange $e^2$, and these flanges rest on corresponding inwardly-directed beads $e^3$, slightly below the top of the part $b$ of the sink, whereby the top of the receptacle $e$ and the top of the supplemental part $b$ of the sink are flush when said receptacle $e$ is in position. The receptacle $e$ and the part $b$ of the sink are provided with a cover $f$, which is hinged to the back of the part $b$, as shown at $f^2$, and said cover is provided at the front edge portion thereof with a knob or handle $f^3$, whereby it may be raised. The walls of the receptacle $e$ and the bottom thereof are perforated, as shown at $e^4$, and the wall thereof adjacent to the main part $a$ and the corresponding wall of the supplemental part $b$ of the sink are provided with a transverse slot or opening $g$, the bottom wall of which is flush with the bottom of the main part $a$ of the sink, and the bottom wall of the slot or opening $g$ in the receptacle $e$ is beveled or downwardly inclined, as shown at $g^2$. The slot or opening $g$ is closed by a vertically-removable door or slide $h$, mounted in keepers $h^2$ at the end of the main part $a$ of the sink adjacent to the supplemental part $b$, and the door or slide $h$ is preferably provided at the bottom thereof with a flexible strip $h^3$ of rubber or similar material.

The removable receptacle $e$ is provided with hinged handle members $i$, which fold inwardly and downwardly, and the operation of the device will be readily understood from the foregoing description when taken in connection with the accompanying drawings and the following statement thereof. When it is desired to wash dishes or other articles, they are placed in the main part $a$ of the sink and the door or slide $h$ is placed in position, and the washing-water is also poured into the main part $a$ of the sink. When it is desired to discharge the water from the part $a$ of the sink after the dishes or other articles have been washed, the door or slide $h$ is raised, and the water, together with any lumpy or foreign substance, flows into the receptacle $e$ through the slot or opening $g$. The water is drained from the receptacle $e$ through the perforations $e^4$ in the sides and bottom thereof and flows off through the pipe $c$ in the usual manner, and any lumpy bodies or foreign substances are retained in the receptacle $e$, and said receptacle may be cleaned at any time by raising it out of the part $b$ of the sink. By means of this construction no bodies or foreign substances are allowed to pass into the pipe $c$ and the latter is not clogged or closed and prevented from operating.

The door or slide $h$ is of a vertical width greater than the depth of the part $a$ of the sink, and said door or slide may be used to scrape various substances from the bottom of the part $a$ of the sink and pass the same through the slots or openings $g$ into the supplemental or transverse end part $b$ of the sink or the removable receptacle $e$.

My improved sink is simple in construction and operation and may be used wherever devices of this class are required and for any desired purpose.

Having fully described my invention, what I claim as new, and desire to secure by Letters Patent, is—

1. A sink, comprising a main part and a transverse end member deeper than the main part, the wall of the transverse end member being provided with a slot or opening at the bottom of the main part of the sink, and a removable receptacle placed in the transverse end member the bottom walls of which are perforated and the side of which adjacent to the main part of the sink is provided with a transverse slot or opening which corresponds with the slot or opening in the side of the end member, the end of the main part adjacent to the transverse end member being also provided with a removable door or slide adapted to close said slots or openings, substantially as shown and described.

2. A sink, comprising a main part and a transverse end member deeper than the main part, the wall of the transverse end member being provided with a slot or opening at the bottom of the main part of the sink, and a removable receptacle placed in the transverse end member the bottom walls of which are perforated and the side of which adjacent to the main part of the sink is provided with a transverse slot or opening which corresponds with the slot or opening in the side of the end member, the end of the main part adjacent to the transverse end member being also provided with a removable door or slide adapted to close said slots or openings, and the top of the transverse end member and the removable receptacle placed therein being provided with a hinged cover, substantially as shown and described.

In testimony that I claim the foregoing as my invention I have signed my name, in presence of the subscribing witnesses, this 4th day of June, 1904.

JULIUS KOSLOFSKY.

Witnesses:
F. A. STEWART,
C. J. KLEIN.